United States Patent [19]

June, Jr.

[11] 4,277,521
[45] Jul. 7, 1981

[54] METHOD OF COATING THE INTERIOR SURFACES OF VEHICLES WITH POLYVINYL ACETATE

[76] Inventor: Robert F. June, Jr., 10286 W. Seven Mile, Northville, Mich. 48167

[21] Appl. No.: 801,468

[22] Filed: May 31, 1977

[51] Int. Cl.$^3$ ............................................. B62D 33/00
[52] U.S. Cl. .................................. 427/236; 296/39 A
[58] Field of Search ............ 427/230, 236; 296/39 R, 296/39 A, 31 P; 260/33.4, 15, 29.6 BE, 29.6 B, 29.6 ME

[56] References Cited

U.S. PATENT DOCUMENTS

| | | | |
|---|---|---|---|
| 2,324,739 | 7/1943 | Stoops | 260/33.4 |
| 2,351,301 | 6/1944 | Sonnichsen | 260/29.6 BE |
| 2,587,833 | 3/1952 | Germain | 260/29.6 BE |
| 2,595,952 | 5/1952 | Kunze | 260/33.4 X |
| 2,993,017 | 7/1961 | Sucetti | 260/15 |
| 3,778,399 | 12/1973 | Fazioli | 260/29.6 BE |

FOREIGN PATENT DOCUMENTS

| | | | |
|---|---|---|---|
| 433901 | 5/1934 | United Kingdom | 296/39 A |
| 986632 | 6/1961 | United Kingdom | 252/62 |

OTHER PUBLICATIONS

Chem. Abstract, 14487 h, vol. 56.
Chem. Abstract, 41659, vol. 62, 1965.
Kirk Othmer of Chemical Technology, pp. 344 & 351.

*Primary Examiner*—Sam Silverberg
*Attorney, Agent, or Firm*—Basile, Weintraub & Hanlon

[57] ABSTRACT

The interior surface of vehicles is sprayed with an emulsion of polyvinyl acetate forming a decorative, tough, flexible insulative coating thereon. The coating is water repellant and fire resistant.

4 Claims, No Drawings

METHOD OF COATING THE INTERIOR SURFACES OF VEHICLES WITH POLYVINYL ACETATE

BACKGROUND OF THE INVENTION

1. Field of the Invention

This invention relates to a method for coating the interior surface of vehicles employing an emulsion of polyvinyl acetate. More particularly, the present invention relates to a process for coating the interior surfaces of vehicles with a decorative, tough, flexible, insulative film employing an emulsion of polyvinyl acetate containing cork and asbestos fibers.

2. Prior Art

The trend in our present day society is the increased use of trucks and automobile vans as utility and recreational vehicles. These vehicles are modified to incorporate the various accessories necessary to fulfill the function of a mobile home. It is most desirable that the interior surfaces of this vehicle has insulative properties from both heat and cold. Furthermore, it is desirable that the interior surface have a decorative, tough, flexible coating. Furthermore, it is important that such coatings be water repellant and fire resistant. The embodiments of the instant invention afford just such a surface coating.

SUMMARY OF THE INVENTION

In accordance with this invention there is provided a method for coating the interior surface of a vehicle which comprises: spraying the interior surface of the vehicle with an emulsion of polyvinyl acetate. Preferably, the emulsion is utilized to spray the interior of a van-type vehicle.

DESCRIPTION OF THE PREFERRED EMBODIMENT

In the preferred embodiment of this invention there is provided a method for coating the interior surfaces of vehicles with a polyvinyl acetate composition which comprises:

(a) spraying onto the interior wall(s), a composition comprising:
(1) a polyvinyl acetate emulsion, and
(2) a polyhydric alcohol, and
(b) impinging the spray upon said interior surface of said vehicle whereby adherence of said composition is affected upon said interior surface.

Any commercially available polyvinyl acetate emulsions may be employed in the practice of the instant invention. In general, the concentration of polyvinyl acetate can vary from about 15 to about 45 weight percent of the total weight of the emulsion. A mixture of water and a lower alcohol such as methanol, ethanol or isoproponal may be used to form the emulsions. Plasticizers such as various phtalates, tartrates, phosphates, abietates and glycollates may also be incorporated in the emulsions.

In the preferred embodiment of the invention an aqueous emulsion of polyvinyl acetate is utilized. The emulsion hereof, further comprises cork and asbestos fibers. To this emulsion is then added an amount of polyhydric alcohol sufficient to achieve an emulsion consistency to permit easy spraying of the emulsion. The amount of polyhydric alcohol employed ranges from 0.1 to 10 weight percent of the emulsion, preferably from about 0.2 to 1.0 weight percent.

The polyhydric alcohol which may be employed in the practice hereof includes ethylene glycol, propylene glycol, butylene glycol, glycerol, diethylene glycol, dipropylene glycol and the like, as well as mixtures thereof. The preferred polyhydric alcohol is ehtylene glycol. The alcohol is deployed in the amount heretofore specified.

In practicing the invention the polyvinyl acetate emulsion is admixed with the alcohol. Thereafter, the admixture is sprayed onto the interior surfaces of motor vehicles, such as trucks and vans at temperatures ranging from 15° C. to 60° C., preferably, at a temperature range of from about 20° C. to 30° C. Any commercially available spraying equipment can be utilized. The spraying pressure can vary from about 70 to 80 p.s.i.g., preferably, from about 40 to 60 p.s.i.g.

The interior surfaces of the vehicles are sprayed with the polyvinyl acetate until the desired coat thickness is achieved. This coat thickness can vary from about one-sixteenth of an inch to about one-half inch thick. However, a film thickness from one-eighth to one quarter inch is preferred. The coating is then allowed to dry at ambient temperatures from 24 to 48 hours.

Surface pre-treatment is generally not required, although it is desirable to remove oily or waxy films and loose particles such as dirt and scole prior to spraying.

If desired, various coloring agents can be added to the polyvinyl acetate emulsions.

The coating thus obtained is a decorative, tough, flexible, fire, water and weather resistant coating having both low and high temperature thermal insulation.

For a more complete understanding of the present invention, reference is made to the following example thereof. In the example, which is illustrated and not limitative of the invention, all percentage and parts are weight unless otherwise indicated.

EXAMPLE

To a polyvinyl acetate emulsion containing cork and asbestos fibers is added 0.5 weight percent ethylene glycol sold commercially under the name WIMASCO WC-1-Type "C" by Wimasoc Corporation. The spray equipment employed is a Graco President 10:1 #205-627 pump and a Graco Air Spray Master Gun. The pressure employed ranges from 40 to 60 p.s.i.g. at an ambient temperature of about 25° C. The rate of discharge from the gun varies between 1.5 and 5 pounds per minute. The interior surface of a van is sprayed until a thickness of one-eighth inch is attained. The coating dries in 48 hours at ambient conditions. The coating obtained is flexible, good weathering and insulative properties, as well as being water repellent and fire resistant.

It should, also, be noted with respect hereto that the insulating composition hereof can be deployed as an insulative coating for exterior portion of the vehicle. Thus, the composition can be sprayed onto the undersurface of the cowl or head of the vehicle, as well as in other exterior locations. Such utilization of the composition is within the ambit of the present invention.

Having, thus, described the invention what is claimed is:

1. In a method for thermally insulatively coating the interior surface of a vehicle, the improvement which comprises:

(a) spraying onto the interior a polyvinyl acetate composition consisting essentially of:
   (1) an aqueous polyvinyl acetate emulsion,
   (2) monomeric ethylene glycol,
   (3) a compound selected from the group consisting of cork, asbestos fibers and mixtures thereof, and
(b) impinging the spray upon said interior surface of said vehicle to adhere said composition to said interior surface to provide a thermal insulative coating thereupon.

2. The method of claim 1 wherein the concentration of ethylene glycol is from 0.1 to 10 weight precent of the total weight of the emulsion.

3. The method of claim 1 wherein said composition is sprayed at a pressure of 40 to 60 p.s.i.g.

4. The method of claim 1 wherein said composition is sprayed at a temperature ranging from 15° C. to 60° C.

* * * * *